United States Patent
Gaessler et al.

(10) Patent No.: US 6,659,083 B2
(45) Date of Patent: Dec. 9, 2003

(54) METHOD AND DEVICE FOR OPERATING AN INTERNAL COMBUSTION ENGINE

(75) Inventors: Hermann Gaessler, Vaihingen (DE); Udo Diehl, Stuttgart (DE); Karsten Mischker, Leonberg (DE); Rainer Walter, Pleidelsheim (DE); Bernd Rosenau, Tamm (DE); Juergen Schiemann, Markgroeningen (DE); Christian Grosse, Kornwestheim (DE); Georg Mallebrein, Korntal-Muenchingen (DE); Volker Beuche, Stuttgart (DE); Stefan Reimer, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/145,195

(22) Filed: May 14, 2002

(65) Prior Publication Data

US 2002/0189581 A1 Dec. 19, 2002

(30) Foreign Application Priority Data

May 15, 2001 (DE) .......................................... 101 23 624

(51) Int. Cl.$^7$ ............................................... F02M 41/00
(52) U.S. Cl. ....................... 123/443; 123/90.15; 123/305
(58) Field of Search ................................. 123/443, 305, 123/90.15, 434, 294

(56) References Cited

U.S. PATENT DOCUMENTS

| | | | | |
|---|---|---|---|---|
| 6,324,835 | B1 | * 12/2001 | Surnilla et al. | ................ 60/274 |
| 6,360,713 | B1 | * 3/2002 | Kolmanovsky et al. | ...... 123/295 |
| 6,494,179 | B1 | * 12/2002 | Pantring et al. | ............ 123/295 |

* cited by examiner

Primary Examiner—Bibhu Mohanty
(74) Attorney, Agent, or Firm—Kenyon & Kenyon

(57) ABSTRACT

A method and a device for operating an internal combustion engine including a plurality of cylinders, determine whether a torque of the internal combustion engine is above a torque threshold value. If the torque is less than the torque threshold value, all the cylinders of the engine are operated in a lean operating state. If the torque is greater than or equal to the torque threshold value, a first number of cylinders of the engine is operated in a homogeneous operating state, and the remaining cylinders of the engine are operated in the lean operating state.

7 Claims, 4 Drawing Sheets

METHOD AND DEVICE FOR OPERATING
AN INTERNAL COMBUSTION ENGINE

FIELD OF THE INVENTION

The present invention relates to a method of operating an internal combustion engine including a plurality of cylinders as well as a control device for controlling operation of an engine in which each of a plurality of cylinders includes a plurality of valves, and at least one valve of the plurality of valves of each of the plurality of cylinders includes a fully variable valve operating mechanism.

BACKGROUND INFORMATION

In modern automotive engineering, OTTO engines having direct injection are used to an ever increasing extent. In direct a fuel injection, the fuel to be burned is injected directly through an injector into the combustion chamber of a cylinder.

FIG. 5 is a diagram illustrating various operating states which are possible in an OTTO engine having direct injection. The rotational speed of the OTTO engine is plotted on the abscissa of FIG. 5. Torque M of the engine is plotted on the ordinate of the diagram in FIG. 5. Reference number 1 denotes a graph delimiting a first operating state of the OTTO engine. Within the range delimited by graph 1 running from torque M1 to rotational speed N1, the engine is operated in a stratified charge operation having exhaust gas recirculation (EGR). In stratified charge operation having exhaust gas recirculation, a leaner mixture in which $\lambda > 1$ is sent to the cylinders of the engine, where $\lambda$ is defined as the amount of air supplied divided by the theoretical air requirement. The lean mixture contains more air in comparison with the stoichiometric air-fuel mixture in which $\lambda = 1$.

The air-fuel ratio or mixture determines to a significant extent the torque, smooth running, fuel consumption and exhaust emissions of an OTTO engine.

In an OTTO engine including fully variable valve operating mechanism, such as an electrohydraulic valve operating mechanism (EHVS), filling of the cylinders with gas is adjusted through the valve control times of the intake and exhaust valves of the OTTO engine. In fully variable valve operating mechanism, the engine valve operations and the quantities of intake air are flexible. The quantities of intake air and residual gas for combustion in each cylinder may be controlled by varying the point in time of opening and/or closing the intake valves. This eliminates the need for air throttling of the intake air or an EGR system for adding recirculated exhaust to the intake air. In fully variable valve operating mechanism, an individual gas filling may be set for each cylinder by individual valve point in time information, i.e., through individual adjustment of the point in time of opening and/or closing of the intake valves and/or exhaust valves.

Exhaust gas recirculation is implemented in stratified charge operation in that an exhaust valve closing point in time (AS point in time), i.e., the point in time at which the exhaust valve of the cylinder is closed, is delayed to establish a valve overlap between the open states of the intake and exhaust valves within a cylinder. By controlling the amount of residual gas in the cylinder, it is possible to control nitrogen oxide emission by the OTTO engine.

In other words, the intake valve and the exhaust valve of the cylinder are controlled so that valve elevation curves of the intake valve and the exhaust valve overlap, so that residual gas from combustion remains in the combustion chamber, thus resulting in determination of a lower fresh gas filling.

In the range between graph 1 and graph 2, which runs from torque $M_2$ to rotational speed $n_2$, the engine is operated in homogeneous operation with exhaust gas recirculation and where lambda>1 which is denoted as lean homogeneous operation.

In a range above graph 2 and below graph 3 which runs from torque $M_3$ to rotational speed $n_3$, the engine is operated in a homogeneous operating state. In this operating state, the OTTO engine is operated at a stoichiometric ratio, i.e., at $\lambda=1$.

The lean operating state and stratified charge operation according to graphs 1 and 2 have up to 20% lower specific fuel consumption in comparison with the homogeneous operating state. Accordingly, for lower fuel consumption, it may be desirable to operate the OTTO engine in the lean operating state as much as possible.

However, there are narrow limits to lean stratified charge operating state. The maximum torque of a cylinder or of the OTTO engine in the lean operating state is only approx. 60% as high as the maximum torque in homogeneous operation at lambda=1, because further expansion of the lean operating state leads to production of a great deal of soot and to increased exhaust emissions. Consequently, with the OTTO engines conventionally used today, all the cylinders are operated in the lean stratified charge operating state up to a torque of approx. 60% of the maximum torque of the engine, and above this limit, i.e., above graph 2 in FIG. 5, all the cylinders are operated in the homogeneous operating state, which is less favorable in terms of fuel consumption.

Frequently, the homogeneous lean operating state is not reached at all. When the torque of the engine, in the case of a traditional OTTO engine having direct fuel injection of gasoline, rises above a value of approx. 60% of the maximum torque, all cylinders are switched from the lean stratified charge operating state to the homogeneous operating state at lambda=1. Since pressure in an intake manifold of an OTTO engine is unable to change suddenly, this switching causes jerking. It is possible to make a firing angle of the cylinder later in the homogeneous operating state until the excess intake manifold pressure has dissipated in the intake manifold in order to reduce this switching jerk while still including a high intake manifold filling. However, this only helps to dampen the switching jerk slightly. There are also disadvantages to a late firing angle in terms of fuel consumption when switching from the lean operating state to the homogeneous operating state.

It is an object of the present invention to provide a method of operating an internal combustion engine and a control device for controlling operation of an engine to permit low fuel consumption by the engine.

SUMMARY

The method according to the present invention of operating an engine including a plurality of cylinders determines whether an engine torque is above a torque threshold value. If the specific torque is less than the torque threshold value, then all the cylinders of the plurality of cylinders of the engine are operated in the lean, stratified charge operating state. If the torque determined is greater than or equal to the torque threshold value, some of the plurality of cylinders of the engine being operated in a homogeneous operating state at lambda=1, the remaining cylinders of the plurality of engines are operated in the lean, stratified charge operating state.

This means that at an engine torque above the torque threshold value, individual cylinders are operated in the lean operating state. Thus, a ratio of a torque contribution of the cylinders in the lean operating state to a maximum torque contribution of this cylinder is equal to or less than a ratio of the torque threshold value to the maximum engine torque. Accordingly, a ratio of the respective torque contributions of the cylinders operated in the homogeneous operating state to the maximum torque contribution of this cylinder is greater than the ratio of the torque threshold value to the maximum engine torque.

The present invention may permit lower fuel consumption because the fuel consumption advantages of the lean operating state or stratified charge operation are shifted toward higher engine torques without any greater production of soot or gas emissions.

The present invention may be arranged so that the number of cylinders operated above the torque threshold value in the homogeneous operating state increases with an increase in torque. This means that progressively more cylinders are switched to the homogeneous operating state the greater the increase in engine torque above the torque threshold value.

According to this example embodiment of the present invention, not all cylinders are switched simultaneously from the lean operating state to the homogeneous operating state, but instead there is progressive incremental switching, so the present invention may permit a reduction in the switching pressure at the rotational speed threshold. Furthermore, the present invention may make it unnecessary to shift the firing angle to a later point in time in the homogeneous operating state, so this may yield an engine having reduced fuel consumption.

The control device according to the present invention for controlling operation of an engine in a plurality of cylinders, includes a plurality of valves, and at least one valve of the plurality of valves of each of the plurality of cylinders includes a fully variable valve operating mechanism, includes a comparator device for determining whether an engine torque is equal to or greater than a torque threshold value, and a valve opening control device. The valve control device is configured to control the actuation of at least one of the plurality of valves of each of the plurality of cylinders when the torque is less than the torque threshold value, such that all the cylinders of the engine are operated in lean operation. The valve-opening control device is also configured to control the actuation of at least one of a plurality of valves of the cylinder of the engine when the torque is equal to or greater than the torque threshold value, such that some of the cylinders of the engine are operated in a homogeneous operating state, the remaining cylinders of the engine being operated in the lean operating state.

The control device according to the present invention may permit fuel-saving operation of the engine. Furthermore, the control device according to the present invention has a simple configuration which may be inexpensive to produce.

The torque threshold value may be the torque at which soot production in the cylinders of the engine in the lean operating state goes beyond the required soot emission levels to be maintained. Required soot emission levels to be maintained may be, for example, maximum emission levels for soot that are established by the state.

The present invention may be arranged such that the valve opening control device increases the number of cylinders operated above the torque threshold value in homogeneous operation with an increase in torque.

This example embodiment of the present invention may permit a fuel-efficient and almost jerk-free operation of the engine when switching from a lean operating state to a homogeneous operating state.

Example embodiments of the present invention are illustrated in the accompanying figures and described below on the basis of example embodiments.

DETAILED DESCRIPTION

The present invention is described below on the example of a six-cylinder OTTO engine having direct injection and fully variable valve operating mechanism. This OTTO engine includes one exhaust valve and one intake valve per cylinder. Both the intake valve and the exhaust valve include a variable valve operating mechanism, so that the points in time for opening and/or closing the intake and exhaust valve as well as the lift of both valves may be controlled freely, i.e., independently of one another and of the other valves of the other cylinders. The OTTO engine in this example embodiment also does not include a throttle valve. Air throttling and exhaust gas recirculation are performed by varying the points in time of opening and/or closing the intake and exhaust valves and the lift of the intake and exhaust valves.

However, the present invention is not limited to this example of an OTTO engine, but instead may also be applied in the same manner to multiple-cylinder engines including at least one valve per cylinder with fully variable valve operating mechanism. These engines may also be operated with other fuels such as diesel fuel. Furthermore, the present invention is not limited to a four-cycle engine but instead is equally applicable to a two-cycle engine, a six-cycle engine or more. The present invention is applicable to engines including multiple intake and exhaust valves per cylinder.

Figure 1:
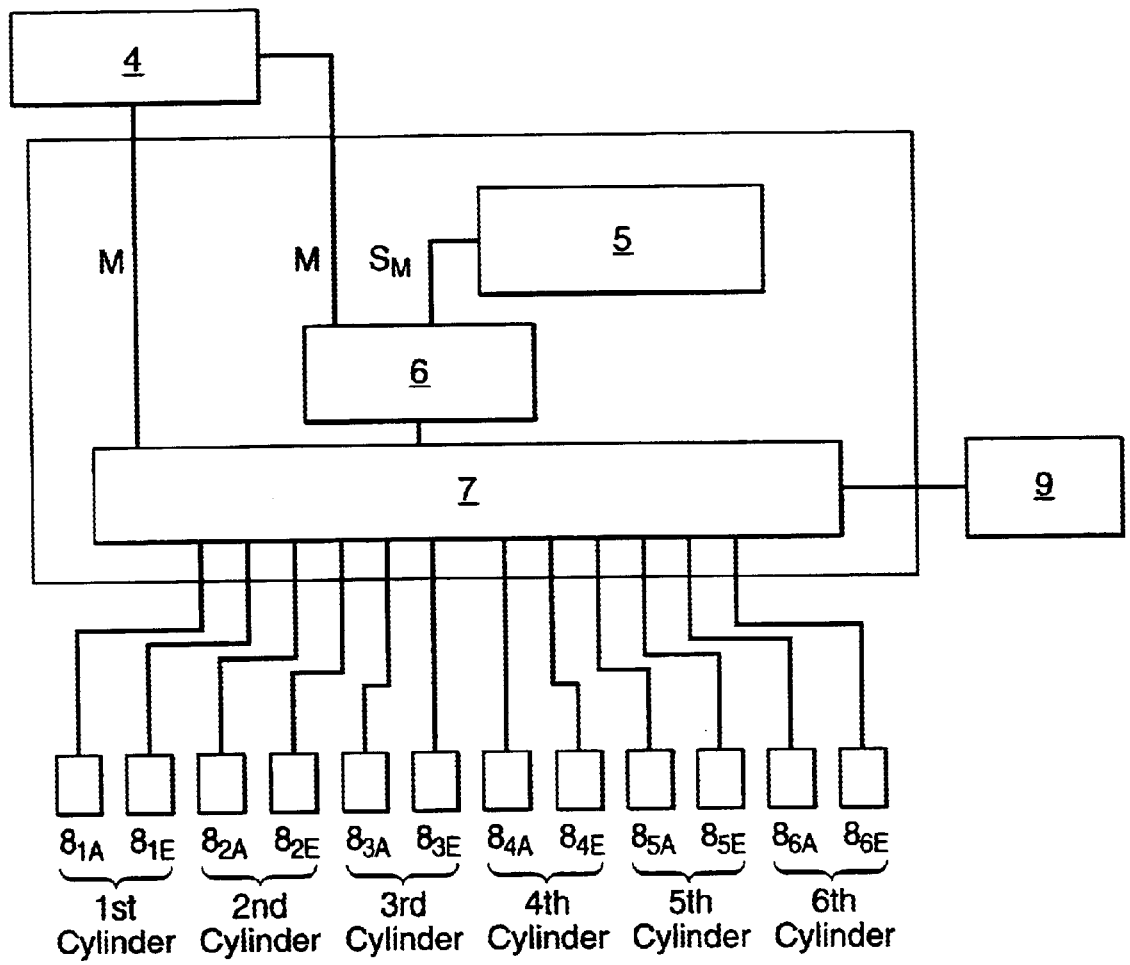
FIG. 1 illustrates an example embodiment of the control device according to the present invention.

FIG. 1 illustrates an example embodiment of the control device according to the present invention.

The control device includes a torque threshold value preselecting device 5, a comparator 6 and a valve opening control device 7. Reference number 4 in FIG. 1 denotes a torque detection device. Torque threshold value preselecting device 5 may include a storage device such as a read-only memory ROM in which a preselected torque threshold value $S_M$ is stored. Torque threshold value preselecting device 5, however, may also be configured in the form of a microprocessor device which determines a torque threshold value $S_M$ as a function of operating state variables such as a temperature, a setpoint engine torque or a setpoint torque of an individual cylinder.

Torque threshold value preselecting device 5 outputs torque threshold value $S_M$ to comparator 6. Comparator 6 also receives as an input quantity an output signal of a torque detection device 4 which indicates torque M delivered instantaneously by the OTTO engine.

Comparator 6 compares torque M with torque threshold value $S_M$ and delivers a signal to valve opening control device 7 when torque M is equal to or greater than torque threshold value $S_M$.

Valve opening control device 7 delivers control signals to a gas exchange controller $8_{1A}$ for an exhaust valve of the first cylinder, a gas exchange controller $8_{1E}$ for an intake valve of the first cylinder, a gas exchange controller $8_{2A}$ for an exhaust valve of the second cylinder, a gas exchange controller $8_{2E}$ for an intake valve of the second cylinder, a gas exchange controller $8_{3A}$ for an exhaust valve of the third cylinder, a gas exchange controller $8_{3E}$ for an intake valve of the third cylinder, a gas exchange controller $8_{4A}$ for an exhaust valve of the fourth cylinder, a gas exchange controller $8_{4E}$ for an intake valve of the fourth cylinder, a gas exchange controller $8_{5A}$ for an exhaust valve of the fifth cylinder, a gas exchange controller $8_{5E}$ for an intake valve of the fifth cylinder, a gas exchange controller $8_{6A}$ for an exhaust valve of the sixth cylinder, a gas exchange controller $8_{6E}$ for an intake valve of the sixth cylinder of the OTTO engine.

Reference number 9 in FIG. 1 denotes a fuel injection control device. This fuel injection control device 9 controls fuel injectors of the OTTO engine and specifies the amount of fuel to be injected into each individual cylinder. Fuel injection control device 9 is connected to valve opening control device 7 and outputs a synchronization signal as well as a signal indicating the quantity of fuel to be injected to valve opening control device 7.

Valve opening control device 7 determines control signals for gas exchange controllers $8_{1A}$, $8_{1E}$ through $8_{6E}$ on the basis of the output signal of comparator 6, torque M, which is detected by torque detection device 4, and the output signals of fuel injection control device 9.

Valve opening control device 7 may include a microprocessor device or a signal generating device such as an EPLD.

One configuration of gas exchange controllers $8_{1A}$, $8_{1E}$ through $8_{6E}$ is described below with reference to FIG. 2.

Since the configuration of gas exchange controllers $8_{1A}$, $8_{1E}$ through $8_{6E}$ is the same, the configuration will be described on the basis of gas exchange controller $8_{1A}$ of the exhaust valve of the first cylinder.

Reference number 10 denotes a first solenoid. First solenoid 10 is arranged in a hydraulic connection 15a between a pressure supply device, such as a common rail, and a first chamber 11 in an actuation device 12. A valve spud 13 of exhaust valve 14 is arranged in actuation device 12. Valve spud 13 is displaceably arranged in actuation device 12. Valve spud 13 separates first chamber 11 from a second chamber 16 in actuation device 12.

A second hydraulic connection 15b is provided between second chamber 16 in actuation device 12 and the pressure supply device. First chamber 11 is also connected to the pressure supply device through a third hydraulic connection 15c via a second solenoid 17.

Figure 2:
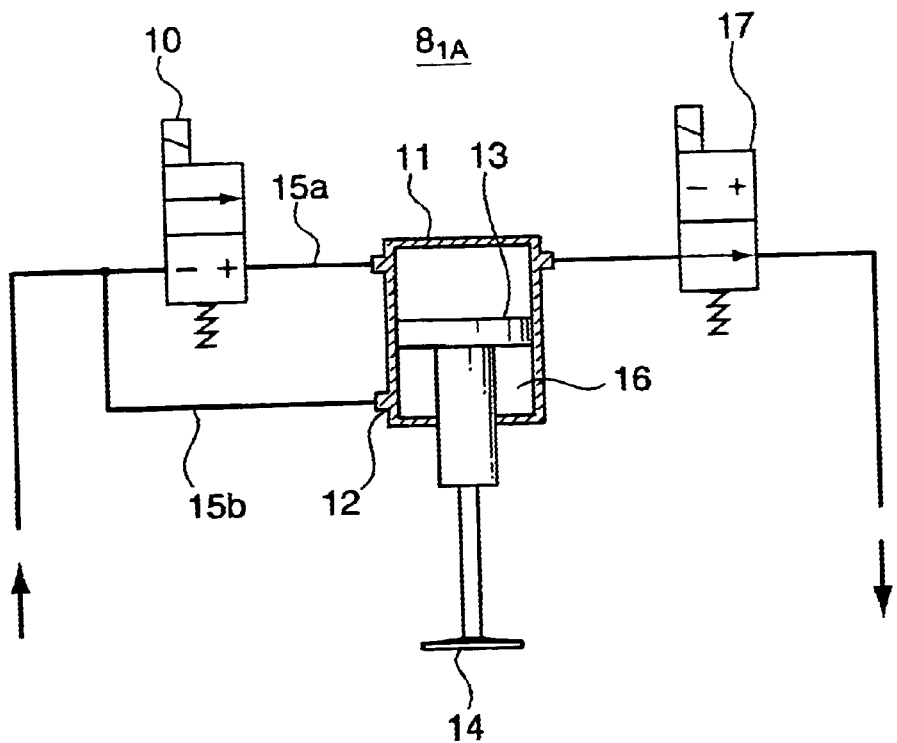
FIG. 2 illustrates a gas exchange controller of a fully variable valve operating mechanism.
Figure 5:
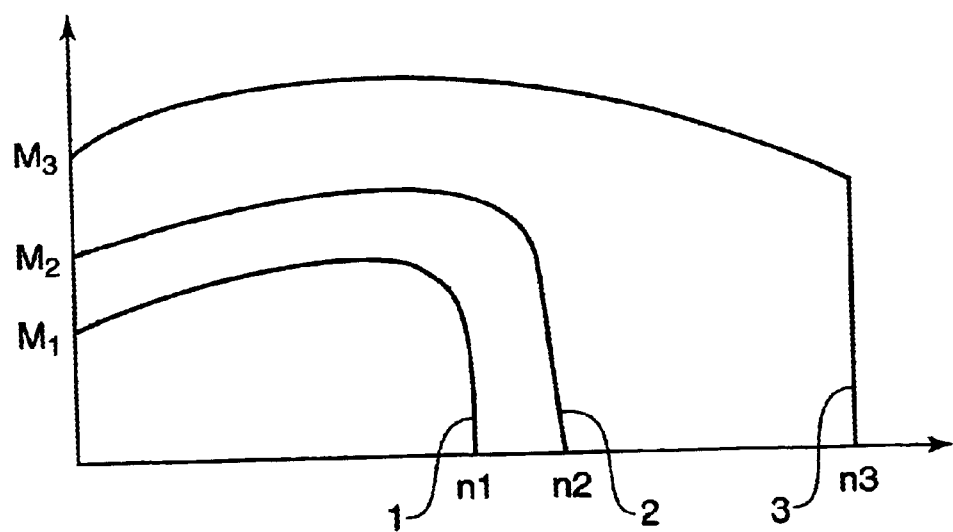
FIG. 5 is a diagram representing various operating states of an OTTO engine having direct injection.

Operation of the gas exchange controller illustrated in FIG. 2 is as follows. When first solenoid 10 is opened, a hydraulic medium under pressure flows from the pressure supply device into first chamber 11. The hydraulic medium fills up first chamber 11 and displaces valve spud 13, which separates first chamber 11 from second chamber 16. This moves exhaust valve 14 downward in FIG. 2. Valve 14 is arranged so that exhaust valve 14 sits in a valve seat in a cylinder head of the OTTO engine when valve spud 13 is at the very top of FIG. 2, i.e., there is no hydraulic medium in first chamber 11, first chamber 11 has a minimal space and the second chamber has a maximal space. In this position, valve 14 closes the exhaust opening of a combustion chamber of the cylinder. When first chamber 11 is filled with the hydraulic medium, exhaust valve 14 is moved out of the valve seat into the combustion chamber of the cylinder, and the exhaust opening of the cylinder is opened. When a desired valve lift is achieved, first solenoid 10 is closed.

To close exhaust valve 14, second solenoid 17 is opened to allow the hydraulic medium in first chamber 11 to flow back through second opened solenoid 17 to the pressure supply device. The hydraulic medium supplied by the pressure supply device under pressure to second chamber 16 then flows into second chamber 16 and thus pushes valve spud 13 upward as illustrated in FIG. 2. Exhaust valve 14 is thus returned to the valve seat and the exhaust opening of the combustion chamber is sealed.

Gas exchange controllers of this type may permit individual valve control for each exhaust valve and each intake valve of the OTTO engine.

Valve opening control device 7 illustrated in FIG. 1 is configured to make the control, i.e., the signals output to gas exchange controller $8_{1A}$, $8_{1E}$ through $8_{6E}$ such that all six cylinders of the OTTO engine are operated in the lean operating state when valve opening control device 7 does not receive an output signal from comparator 6.

Valve opening control device 7 is also configured so that when comparator 6 outputs an output signal to valve opening control device 7, valve opening control device 7 controls the intake and exhaust valves of the six cylinders such that at least one of the cylinders of the engine is operated in the homogeneous operating state and the remaining cylinders are operated in the lean operating state.

The operating state of the individual cylinders of the OTTO engine is controlled by valve opening control device 7 by varying the opening and closing point in time, the opening lift and an opening and closing speed of the intake and/or exhaust valves. At a preselected fuel quantity, valve opening control device 7 adjusts for the homogeneous or lean operating state by controlling the fresh air filling and/or the combustion and/or the residual gas in the cylinders.

Valve opening control device 7 controls the fresh air filling of a cylinder, mainly by the control quantity "intake-closes angle" (ES) and a lift of the intake valve. When the lift of the intake valve is large enough that there is no mentionable differential pressure, i.e., no difference in pressure between the cylinder dividing space and an intake channel of the cylinder, then the "intake-closes angle" is the control quantity with which valve opening control device 7 implements a fresh air filling control. Fresh air filling of the cylinder may be limited here, for example, with an early "intake-closes angle", i.e., closing of the intake valve before bottom dead center of a piston. Furthermore, it is possible with late closing of the intake valve, i.e., a late "intake-closes angle," to limit the fresh air filling into the combustion chamber of the cylinder because the fresh air filling that has already flowed into the combustion chamber is displaced back into the intake manifold again to some extent.

The second main control quantity for the fresh air filling of the cylinder is the lift as a control quantity, i.e., the lift of the intake valve.

The lift determines an intake and exhaust cross section of the valve and thus determines the differential pressure on the valve. Above a certain valve lift, which depends on the configuration of an intake manifold and the valve or the valve seat, extensive pressure equalization is achieved. This means that the pressure difference after opening the valve very rapidly becomes almost zero.

Accordingly, the opening and closing operations of the respective valve are decoupled at a very large lift. This means that early or late opening of the exhaust valve, i.e., an "exhaust-opens angle" sooner or later, has very little influence on the remaining residual gas quantity. In contrast with that, with a small lift the opening and closing operations are greatly coupled. This means that the deciding factor is an opening time area, which is defined as the opening time in crank angle units multiplied by the opening lift, for the charge change, i.e., the exchange of the gas filling in the combustion chamber.

The lift of the intake and exhaust valves depends on a rotational speed of the OTTO engine. A high speed requires a large lift to permit equalization of pressure. At a low rotational speed, a lower lift is sufficient. However, if the lift is too small, it leads to flow losses at a gap between the valve seat and the valve.

A residual amount of combustion gas, which is in the combustion chamber of the cylinder in an intake process, is determined by an "intake-opens angle", i.e., the opening point in time of the intake valve together with an "exhaust-closes angle", i.e., the closing point in time of the exhaust valve. The control quantities "intake-opens angle" and "exhaust-closes angle" have an influence on the fresh air filling of the combustion chamber of the cylinder in that they control the residual gas of a preceding combustion in the following intake operation. If there is a great deal of residual gas in the combustion chamber of the cylinder in the following intake operation, then only a small amount of fresh gas may be supplied. If there is only a small amount of residual gas in the combustion chamber of the cylinder in the following intake operation, a larger amount of fresh gas may be supplied.

The same fresh air filling may be achieved by either reducing the intake lift of the intake valve or, in the case of a large intake valve lift, shifting the "intake-closes angle" control quantity toward early or late.

Valve opening control device 7 thus controls the air filling of the respective cylinders at a predetermined quantity of fuel through a combination of the control variables "intake-closes angle", "intake-opens angle", "exhaust-closes angle", "exhaust-opens angle" and the respective lift of the valves, and does so by controlling gas exchange controllers $8_{1A}$, $8_{1E}$ through $8_{6B}$ such that the corresponding cylinders are operated either in the homogeneous operating state or in the lean operating state.

Furthermore, valve opening control device 7 is configured so that gas exchange controllers $8_{1A}$, $8_{1E}$ through $8_{6E}$ are to be controlled on receipt of the output signal of comparator 6 such that a portion of the six cylinders of the OTTO engine, for example, is operated in a homogeneous operating state, and a second portion, namely the remaining cylinders of the OTTO engine, are operated in the lean operating state. Valve opening control device 7 may be configured to increase the number of cylinders operated in the homogeneous operating state when there is an increase in torque M. This means that fewer cylinders are operated in the lean operating state with an increase in the torque of the OTTO engine.

Figure 3:
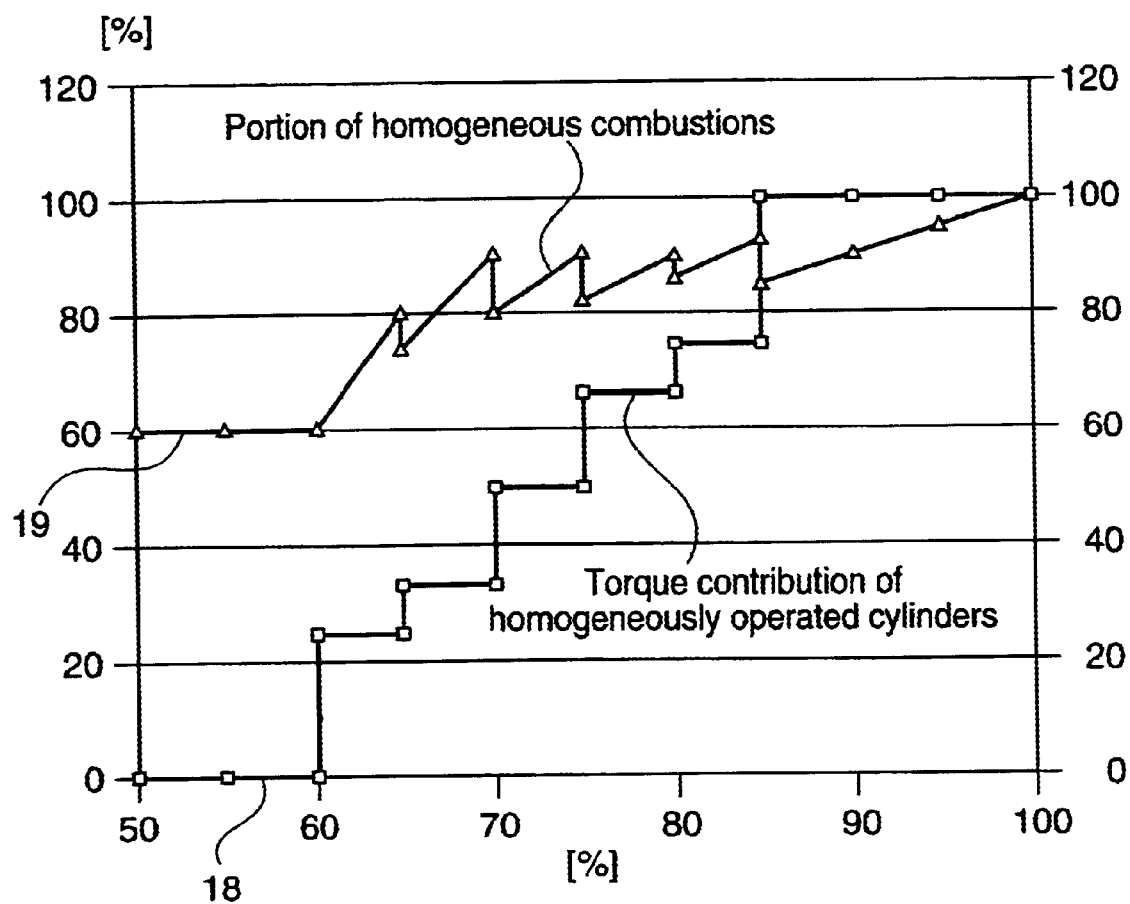
FIG. 3 is a diagram illustrating a torque contribution of homogeneously operated cylinders and a component of homogeneous combustion in an engine in which operation is controlled by the control device according to the present invention.

The method by which valve opening control device 7 alters the number of cylinders of the engine operated in the homogeneous operating state will now be described in detail with reference to FIG. 3. FIG. 3 is a diagram which illustrates a torque contribution of the cylinders in homogeneous operating state to the required OTTO engine torque as a function of the OTTO engine torque, and a portion of homogeneous of all combustion processes as a function of the torque of the OTTO engine.

In FIG. 3 the required OTTO engine torque is plotted on the abscissa as a percentage of the maximum required OTTO engine torque. The required torque is a setpoint OTTO engine torque which is preselected by a power control device such as an accelerator pedal when the OTTO engine is used in a motor vehicle. The OTTO engine torque that may be achieved in the respective homogeneous/stratified charge split operation is plotted as a percentage of the maximum OTTO engine torque on the left ordinate in the diagram illustrated in FIG. 3. The right ordinate in the diagram illustrated in FIG. 3 illustrates the percentage of cylinders operated in split operation in the homogeneous operating state, illustrated as a percentage of the total number of cylinders of the OTTO engine.

Reference number 18 in the diagram illustrated in FIG. 3 denotes a graph having squares indicating the percentage of homogeneous combustions. As indicated by the diagram illustrated in FIG. 3, the percentage of homogeneous combustions of the combustions taking place in the OTTO engine is zero up to torque threshold value $S_W$, which in this case is 60% of the torque of the OTTO engine. Depending on the configuration of the OTTO engine, threshold $S_W$ may also be in a range between 50% and 60%. For example, if one out of four cylinders is switched to homogeneous operation, this increases the percentage of cylinders operated in the homogeneous operating state to 25%. If one out of three cylinders is switched to homogeneous operation, then the percentage is 33%. The percentage of homogeneous combustions and thus the number of cylinders operated in the homogeneous state may be increased incrementally and in steps up to 85% of the required OTTO engine torque (¼, ⅓, ½, ⅔, ¾). Above 85% of the required OTTO engine torque, all cylinders of the four-cylinder OTTO engine are operated in the homogeneous operating state in the example illustrated.

Reference number 19 illustrated in FIG. 3 denotes a graph having triangles representing the torque contribution of the cylinders operated in the homogeneous operating state as a percentage of the maximum OTTO engine torque.

As indicated by the diagram illustrated in FIG. 3, the torque contribution of the homogeneously operated cylinders is 60% of the maximum OTTO engine torque up to the torque threshold value $S_W$. Then the torque contribution of the cylinders operated homogeneously increases incrementally with the same number of steps as the percentage of homogeneous combustions represented by graph 18. The steps in graph 19 are in synchronization with the steps in graph 18. The steps in graph 19 have a steep growth flank followed by a short drop. The angle of slope of the flank decreases with an increase in the homogeneously operated cylinders of the OTTO engine. Above 85% of the required torque, all the cylinders of the OTTO engine are operated in the homogeneous operating state, so the torque contribution of the cylinders operated in the lean operating state is zero above 85% of the required torque.

An example embodiment of the functioning of the control device illustrated in FIG. 1 is described below with reference to FIG. 4.

Figure 4:
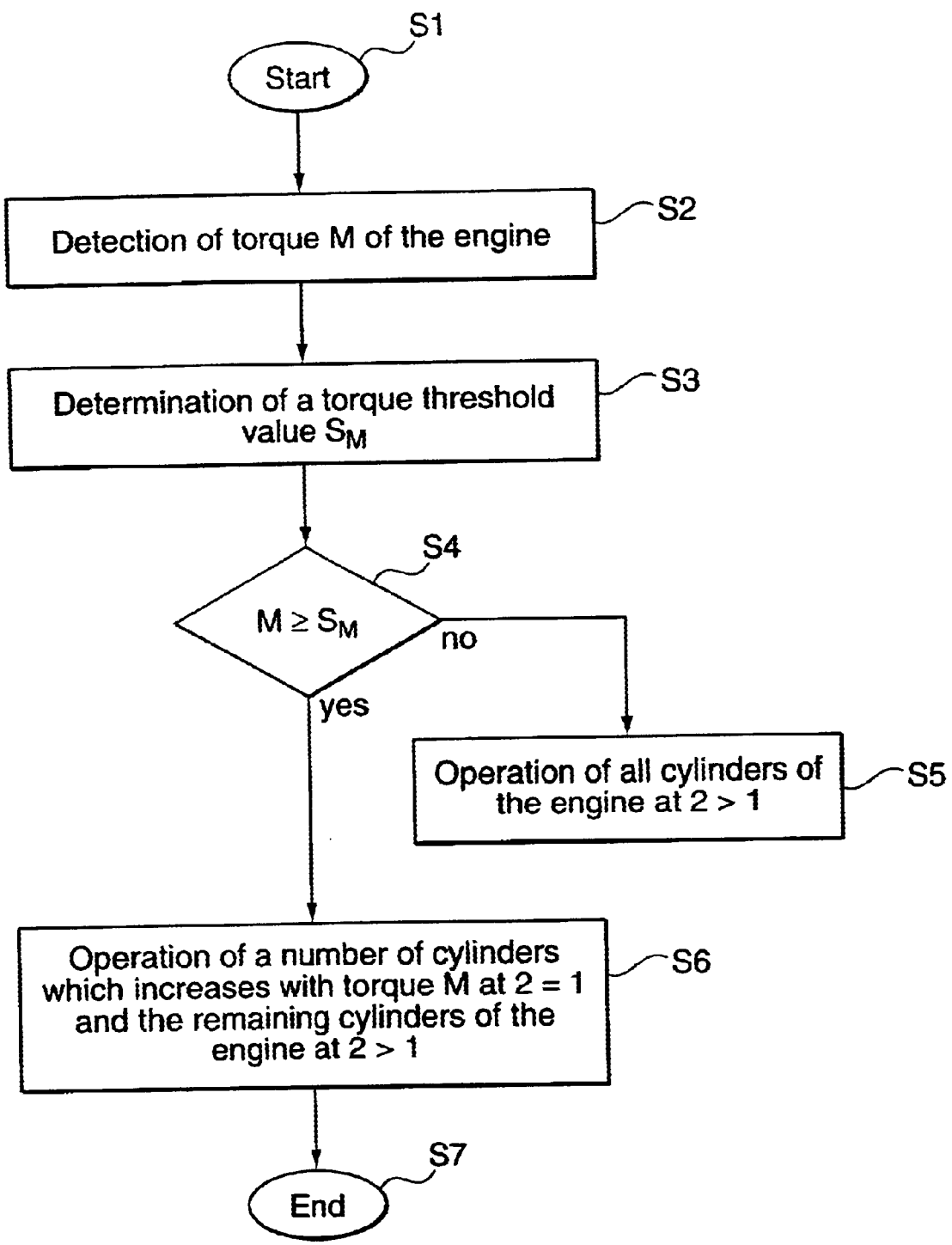
FIG. 4 is a flow chart with an example embodiment of the functioning of the control device according to the present invention as illustrated in FIG. 1.

FIG. 4 is a flow chart which illustrates an example embodiment of the functioning of the control device illustrated in FIG. 1.

After the start in step S1, torque detection device 4 determines torque M of the engine. Processing then proceeds to step S3, where torque threshold value preselecting device 5 determines torque threshold value $S_M$. This may be done by reading out a predetermined torque threshold value $S_M$ from a read-only memory.

However, it is also possible to read threshold value $S_M$ out of a look-up table on the basis of engine state variables such as the required OTTO engine torque, the instantaneous OTTO engine torque, the rotational speed or temperature, each of which is detected by sensors.

Then, processing continues on to step S4 where comparator 6 determines whether torque M detected in step S2 is equal to or greater than torque threshold value $S_M$. If torque M is less than torque threshold value $S_M$, processing continues to step S5, where valve opening control device 7 controls gas exchange controllers $8_{1A}$, $8_{1E}$ through 86, so that all the cylinders of the OTTO engine, all six cylinders in the present example, are operated in a lean operating state. Valve opening control device 7 adjusts for the lean operating state by controlling the control variables "intake-closes angle", "intake-opens is angle", "exhaust-closes angle", "exhaust-opens angle" and the lift of the intake and exhaust valves. Processing ends at step S7.

If comparator 6 finds in step S4 that torque M is equal to or greater than torque threshold value $S_M$, then processing continues to step S6, where some the cylinders of the OTTO engine are operated in a homogeneous operating state, and the remaining cylinders are operated in a lean operating state. This is implemented by the fact that the valve opening control device controls gas exchange controllers $8_{1A}$, $8_{1E}$ through $8_{6E}$ so that the opening and closing times as well as the lift of the intake and exhaust valves of the corresponding cylinders are varied so that individual cylinders are operated in a homogeneous operating state and the remainder of the cylinders are operated in a lean operating state.

The method described here is performed continuously during operation of the internal combustion engine.

What is claimed is:

1. A method of operating an internal combustion engine including a plurality of cylinders, comprising the steps of:
    comparing a torque of the internal combustion engine to a torque threshold value;
    operating all of the cylinders of the plurality of cylinders in a lean operating state when the torque is less than the torque threshold value; and
    operating a first number of the plurality of cylinders in a homogeneous operating state and a remaining second number of the plurality of cylinders in the lean operating state when the torque is greater than or equal to the torque threshold value;
    wherein the first number of cylinders increases with an increase in torque.

2. The method according to claim 1, wherein the torque threshold value is 60% of a maximum engine torque.

3. The method according to claims 1, further comprising the step of setting the lean operating state and the homogeneous operating state by controlling valve opening times of at least one of a plurality of valves of each cylinder of the plurality of cylinders.

4. The method according claim 1, wherein the internal combustion engine includes direct gasoline injection with a fully variable valve operating mechanism.

5. A control device for controlling the operation of an internal combustion engine including a plurality of cylinders each including a plurality of valves, at least one valve of the plurality of valves of each of the plurality of cylinders including a fully variable valve operating mechanism, comprising:
    a comparator device configured to compare a torque of the internal combustion engine to a torque threshold value; and
    a valve opening control device configured to control an actuation of at least one valve including a fully variable valve operating mechanism, of the plurality of valves of each of the plurality of cylinders so that all of the plurality of cylinders are operated in lean operation when the torque is less than the torque threshold value;
    wherein when the torque is greater than or equal to the torque threshold value, the valve opening control device is configured to control the actuation of the at least one valve including a fully variable valve operating mechanism, of the plurality of valves of each of the plurality of cylinders, such that a first number of cylinders of the plurality of cylinders is operated in a homogeneous operating state and a second number of remaining cylinders of the plurality of cylinders is operated in the lean operating state, wherein the valve opening control device is configured to increase the first number of cylinders with an increase in torque.

6. The control device according to claim 5, wherein the torque threshold value is 60% of a maximum engine torque.

7. The control device according to claim 5, wherein the internal combustion engine includes direct gasoline injection.

* * * * *

UNITED STATES PATENT AND TRADEMARK OFFICE
CERTIFICATE OF CORRECTION

PATENT NO. : 6,659,083 B2
DATED : December 9, 2003
INVENTOR(S) : Hermann Gaessler et al.

It is certified that error appears in the above-identified patent and that said Letters Patent is hereby corrected as shown below:

Column 9,
Line 22, change "intake opens is angle" to -- intake opens angle --

Signed and Sealed this

Second Day of November, 2004

JON W. DUDAS
*Director of the United States Patent and Trademark Office*